United States Patent [19]
Kouth

[11] 3,793,772
[45] Feb. 26, 1974

[54] SAFETY MOLDING FOR ELECTRICALLY ACTUATED SLIDING WINDOWS

[75] Inventor: Herbert Kouth, Schoneck-Kilianstadten, Germany

[73] Assignee: Firma H.T. Golde GmbH

[22] Filed: Nov. 17, 1971

[21] Appl. No.: 199,598

[30] Foreign Application Priority Data
Nov. 24, 1970 Germany .................. G 70 43 313.5

[52] U.S. Cl. .......................... 49/28, 49/489, 49/490
[51] Int. Cl. .................................................. E05f 15/08
[58] Field of Search ................ 49/28, 26, 489, 490; 200/61.43, 61.44, 61.42, 61.41

[56] References Cited
UNITED STATES PATENTS

| | | | |
|---|---|---|---|
| 3,662,491 | 5/1972 | Boyriven | 49/28 |
| 3,056,628 | 10/1962 | Golde | 200/61.43 X |
| 3,277,256 | 10/1966 | Jones | 200/61.43 |
| 3,479,768 | 11/1969 | Smadja | 49/490 X |
| 3,465,476 | 9/1969 | Rayner et al. | 49/28 |

Primary Examiner—Mervin Stein
Assistant Examiner—Philip C. Kannan
Attorney, Agent, or Firm—Toren & McGeady

[57] ABSTRACT

A safety molding for electrically actuated sliding windows, such as in motor vehicles, consists of an elastomeric material formed in a U-shaped configuration providing a groove into which the sliding window seats in its closed position. One of the legs of the U-shaped molding contains a longitudinally extending cavity in its interior and a flexible electrical conductor is fitted in a channel formed in the wall of the cavity adjacent the free end of the leg. A metal rib is positioned within the cavity in normally spaced relationship from the conductor. When a pressure is exerted against the outer surface of the free end of the leg containing the cavity, the flexible conductor deflects into contact with the metal rib so that a drive motor for the electrically actuated window can be stopped to avoid any injury or damage if someone or something is located in the path of the closing window and prevents it from moving into its closed position.

4 Claims, 1 Drawing Figure

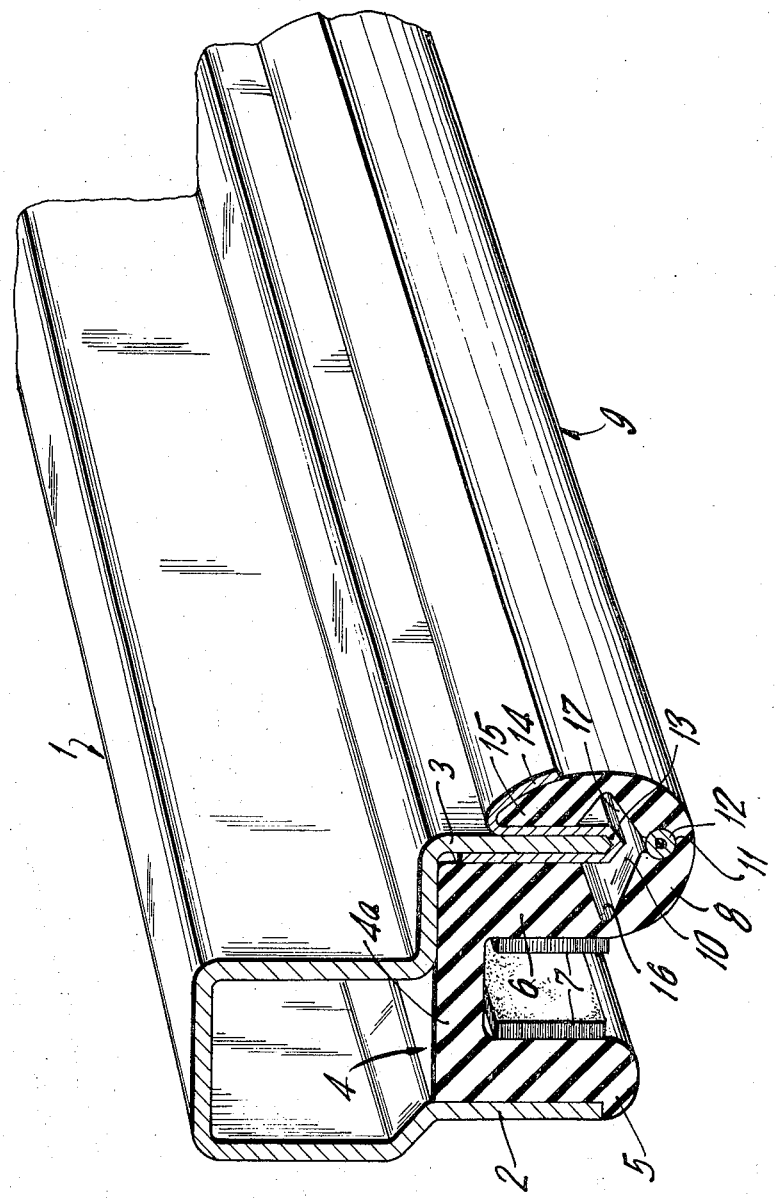

SAFETY MOLDING FOR ELECTRICALLY ACTUATED SLIDING WINDOWS

SUMMARY OF THE INVENTION

The present invention is directed to a safety molding for electrically actuated sliding windows, such as the vertically moving windows in motor vehicles, and, more particularly, it concerns an arrangement within the safety molding for stopping the closing action of the window. Where automatically actuated sliding windows are used, provision must be made to prevent accidents if some part of the human body, such as a hand, or some object such as a piece of baggage, is located in the path of the sliding window as it moves into its closed position. Unless some effort is made to prevent such accidents, serious consequences can occur because considerable pressure is exerted on a small area as the window is driven into its closed position. Torque limitation means, in particular slip clutches, are usually built into electric drive systems for closing windows, however, such means cannot avoid accidents with a satisfactory degree of safety. Such torque limitation means must be adjusted, on one hand, so that the transmission of power continues even if icing conditions exist under winter operation or if the window becomes jammed in its tracks and, on the other hand, once the torque limitation means are set there is no assurance that the setting will remain unchanged over long operating periods of the motor vehicle. Accordingly, the possibility that the torque limitation means may respond too late in the case of an accident, cannot be disregarded.

It has been known to apply a safety strip to the leading edge of a sliding roof in motor vehicles to avoid the occurrence of an accident. The safety strip is intended to arrest or reverse the movement of the sliding roof as soon as any local pressure is exerted against it. Accordingly, a flexible electrical conductor is partially embedded in the safety strip in spaced relationship to a metal strip with which it contacts if the safety strip is deflected. However, because of its form and the manner in which it is secured to the roof, the safety strip is specifically adapted for use on sliding roofs and is not applicable to sliding windows.

Therefore, the primary object of the present invention is to provide a safety molding for use in automatically actuated sliding windows which senses the presence of obstacles in the path of the window as it moves into its closed position so that the window actuation can be stopped. In particular, the structural configuration of the safety molding is provided to conform to the specific requirements for automatically actuated sliding windows in the window frames of motor vehicles and the like.

Therefore, in accordance with the present invention, a safety molding is provided for attachment to the upper edge of a window frame and consists essentially of an elastomeric material formed in a U-shaped configuration which affords a groove into which an automatically actuated window can be seated in the closed position. A longitudinally extending cavity is formed in the interior of one of the legs of the molding and a channel is formed in one of the surfaces of the cavity adjacent the free end of the leg. Positioned within the channel and extending along the length of the cavity is a flexible electrical conductor and a metal rib is positioned in the cavity in spaced juxtaposed relationship to the conductor. The metal rib extends through the leg of the molding into the cavity and is grounded so that when pressure is exerted against the exterior of the molding, the electrical conductor which is not insulated is deflected into contact with the metal rib and affords a circuit closing action for stopping the operation of a drive motor for the window. Accordingly, when pressure is exerted on the safety molding, it responds quickly and reliably and is not unintentionally deflected, whereby it is ideally suited for the prevention of accidents where electrically actuated sliding windows are used.

Advantageously, the safety molding can be provided in an inconspicuous and space-saving arrangement. Preferably, the flexible electrical conductor and metal rib which effect the stopping action for a drive motor are provided in a bead shaped portion at the free end of one leg of the U-shaped molding. In the preferred embodiment of the safety molding it is formed of one piece. Further, the bead shaped arrangement which forms the leg of the molding containing the electrical conductor has a through slot extending inwardly from its end opposite the free end, so that the metal rib can pass through the leg into the cavity adjacent the conductor. In another feature of the invention, the metal rib is provided by a sheet metal strip formed in a U-shaped configuration so that the channel formed by its U-shape can fit into the flange or edge of an upper window frame against which the window closes. One edge of the U-shaped metal rib can be bent outwardly and downwardly at an acute angle into overlapping engagement with the exterior surface of a lip-shaped extension of the leg into which the rib extends. This design of the metal rib enables the safety molding in which the rib is secured, to be fastened quickly and without tools onto the window frame and without the necessity of shaping the window frame in a special manner for securing the rib and the molding.

For reducing the extent of the pressure or force required to deflect the safety molding so that conductor contacts the rib, it is advantageous if at least one of the laterally limiting walls in the cavity is reduced in thickness as compared to the remainder of the leg. Preferably, the reduction in wall thickness can be effected by providing a laterally extending groove in the side wall surfaces of the cavity.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there is illustrated and described a preferred embodiment of the invention.

BRIEF DESCRIPTION OF THE DRAWING

The drawing is a perspective view, partly in section, of an upper window frame molding for a motor vehicle door embodying the present invention.

DETAILED DESCRIPTION OF THE INVENTION

In the drawing, a window frame 1 for a motor vehicle door is shown providing a downwardly directed channel into which an automatically actuated window can be seated in its closed position. The lower end of the window frame 1 is defined by a pair of downwardly extending flanges 2 and 3 with the flange 3 located on the inside of the window, that is in a motor vehicle on the inside of the vehicle. Disposed within the window frame 1, extending between its flanges 2 and 3, is a U-shaped molding 4 formed of an elastomeric material and having a cross-or bight member 4a with a pair of laterally spaced legs 5 and 6 extending downwardly from the cross-member 4a and defining a groove into which the window seats in its closed position. The surfakes of the legs 5 and 6 within the groove are provided with a nap or pile layer 7 resembling a brush. To illustrate the invention more clearly the automatically actuated window which fits into the member 4 is not shown in the drawing.

As compared to the lower or free end of leg 5, the lower or free end of leg 6 has an enlarged bead-like configuration part 8 and incorporates the safety portion 9 of the molding 4. As can be seen in the drawing, the molding 4 extends longitudinally along the frame 1 and a cavity 10 extends in the longitudinal direction of the molding 4 through the interior of the bead-like part 8 of the leg 6. In the lower surface or wall of the cavity, that is the wall adjacent the free end of the leg 6, an undercut longitudinally extending channel 11 is formed into which a flexible, electrical conductor 12 is fitted. The conductor 12 is an uninsulated, braided copper cable provided with a flexible core. In juxtaposed spaced relationship to the conductor is a metal rib 13 which extends through the channel 11 in parallel relationship with the conductor. The leg 6 is slotted from the cross-member 4a downwardly into the cavity 10 and the metal rib 13 sits within the slot. As can be seen in the drawing, the metal rib 13 is basically U-shaped in cross section so that its legs fit in locking engagement over the flange 3 of the window frame molding 1. The locking action of the legs of the metal rib can be intensified by providing them with a slight preloading. The free edge 14 of the outer leg of the metal rib 13, that is the leg located more remotely from the groove into which the window seats in the closed position, is bent obliquely outwardly and downwardly over the lip-shaped extension 15 of the bead-like part 8 of leg 6. A secure connection between the metal rib 13 and the surfaces of the molding 4 can be provided by gluing, vulcanizing and the like.

As is apparent from the drawing, the window, as it closes, moves upwardly into the groove formed in the molding 4. If a pressure or force is exerted against the lower surface of the bead-like part 8 of leg 6, the elastomeric material will deflect upwardly and the electrical conductor 12 will be displaced into circuit-closing contact with the metal rib 13 at any point along its length where is applied. The contacting action between the conductor 12 and the metal rib 13 stops the drive motor or other means which closes the window and the movement of the window is stopped or reversed. While the arrangement is shown specifically for a motor vehicle window which normally closes in the upward direction, it can be appreciated that the window may be oriented other than vertically and it can close in the downward instead of the upward direction. To reduce the force or pressure required to provide contact between the conductor 12 and the rib 13, the side walls of the cavity can be reduced in thickness, such as by providing grooves 16 and 17, so that the wall thicknesses are reduced as compared to the remaining wall thicknesses of the leg 6 and making it easier to deform the bead-like part 8.

While a specific embodiment of the invention has been shown and described in detail to illustrate the application of the inventive principles, it will be understood that the invention may be embodied otherwise without departing from such principles.

What is claimed is:

1. A safety molding for use with electrically actuated sliding windows, such as vertically or approximately vertically movable motor vehicle windows, comprising a longitudinally extending molding formed of an elastomeric material and arranged to be secured to the edge of a window frame opening in which the window seats in its closed position, said molding having a first surface facing in the direction from which the window moves into its closed position, said molding having a U-shaped configuration comprising a pair of laterally spaced legs joined together by a cross-member defining a groove formed in the first surface of said molding and into which the window seats in its closed position, one of said legs having a bead-like configuration at its end spaced from said cross-member and the bead-like configuration forming a portion of the first surface of said molding and projecting away from said cross-member a greater distance than the corresponding end of the other one of said legs, a cavity located within the one of said legs having the bead like configuration and extending therethrough in the longitudinal direction of said molding and said cavity located adjacent said first surface, a longitudinally extending channel formed in the portion of the wall of said cavity which is adjacent to the first surface at the end of the one of said legs spaced from said cross-member, a conductor positioned within and extending through said channel, a longitudinally extending metal rib extending through said molding from the surface thereof opposite said first surface into said cavity and having a longitudinally extending end located within said cavity and disposed in spaced juxtaposed relationship to said conductor, the surface of said conductor facing toward the juxtaposed end of said rib is exposed and said rib is grounded so that when local pressure is exerted against the first surface on the end of said one of said legs spaced from said cross-member said conductor is deflected into contact with said rib and effects a circuit-closing contact for discontinuing the closing movement of the window, said one of said legs having a slot-like opening extending therethrough from said cross-member into said cavity, said metal rib is positioned within said slot-like opening extending therethrough into said cavity from the exterior of said molding on the opposite side thereof from said first surface, said metal rib has a U-shape configuration with its bight portion located within said cavity and its legs extending outwardly therefrom through said slot-like opening, the opening defined by the U-shape configuration of said metal rib being arranged to engage an edge of the window frame opening, and the leg of said metal rib spaced more remotely from the groove formed in said molding being bent over into overlapping contact with the outer surface of said leg through which it extends.

2. A safety molding, as set forth in claim 1, wherein the walls defining the sides of said cavity between the wall containing said channel and the wall through which said metal rib extends are reduced in thickness as compared to the adjacent portions of said leg containing said cavity for increasing the deformability of the free end surface of said leg.

3. A safety molding, as set forth in claim 1, wherein a pile layer is positioned on the oppositely facing surfaces within the channel in said molding into which the window seats in its closed position.

4. A safety molding, as set forth in claim 1, wherein said channel in said cavity is undercut for securing said conductor therein.

* * * * *